United States Patent Office 2,742,469
Patented Apr. 17, 1956

2,742,469

HYDROXYPTERIDINE OXIDES AND METHOD OF PREPARING THE SAME

William B. Wright, Jr., Plainfield, N. J., assignor to American Cyanamid Company, New York, N. Y., a corporation of Maine No Drawing. Application April 16, 1954,
Serial No. 423,843

3 Claims. (Cl. 260—251.5)

This invention relates to a new organic compound. More particularly, it relates to 3-hydroxypteridine-4-one and method of preparation thereof.

In the past numerous pteridines have been prepared, particularly in the synthesis of folic acid and related compounds. Pteridine hydroxamic acids, however, have never been described in the chemical literature. This compound has been found to have anti-bacterial activity against organisms such as E. coli, Strep. hemolyticus, D. pneumonia and B. subtilis.

The compound of the present invention may exist in tautomeric forms and it is believed that it can be represented by one of the following structures:

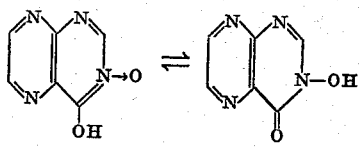

The compound of the present invention in aqueous solution is acidic. It is relatively insoluble in water and most organic solvents, but is soluble in aqueous alkaline solutions. It gives a strong orange-red ferric chloride test and a green color with cupric salts.

The present compound can be prepared by reacting 3-amino-2-pyrazinohydroxamic acid with an alkyl orthoformate in the presence of an acid anhydride. The first product of the reaction is the carboxylic acid acyl derivative which on further heating under alkaline conditions produces the free hydroxyl compound. This compound is recovered by acidifying the reaction mixture with a mineral acid and cooling to precipitate the product. The precipitated product is removed by filtration and washed with, for example, cold water and acetone.

The initial reaction to prepare the compound of the present invention takes place at a temperature within the range of 100° to 225° C. Good results have been obtained by heating the reaction mixture at refluxing temperatures for from 30 minutes to several hours.

The following example illustrates in greater detail the preparation of the compound of the present invention.

A mixture of 3.08 parts of 3-amino-2-pyrazinohydroxamic acid, 32 parts of acetic anhydride and 27 parts of ethyl orthoformate is heated at reflux for two hours. The reaction is then concentrated almost to dryness and the precipitate is filtered, washed with ether and oven dried. The yield of 3-acetoxypteridine-4-one is almost quantitive. This may be purified by recrystallization from ethanol.

The above compound is warmed on the steam bath for three minutes with 35 parts by volume of 1 N sodium hydroxide, cooled in an ice bath for 10 minutes, then treated with activated carbon and clarified. The filtrate is acidified with 5 N hydrochloric acid to a pH of 2.75, cooled to 5° C. and filtered. After washing with cold water and acetone, a 60% yield of a material which analyzes correctly for 3-hydroxypteridine-4-one is obtained. This compound melts with decomposition at 276° C.

I claim:

1. A compound having the formula:

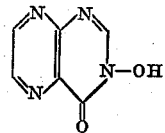

2. A method of preparing a compound having the formula:

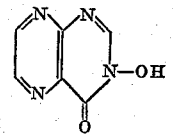

which comprises heating 3-amino-2-pyrazinohydroxamic acid with an alkyl orthoformate in the presence of a lower alkanoic anhydride and subsequently with an alkali metal hydroxide and recovering said compound.

3. A method of preparing 3-hydroxypteridine-4-one which comprises heating 3-amino-2-pyrazinohydroxamic acid with ethyl orthoformate in the presence of acetic anhydride and subsequently with an alkali metal hydroxide and recovering said compound.

No references cited.